Figure 1:
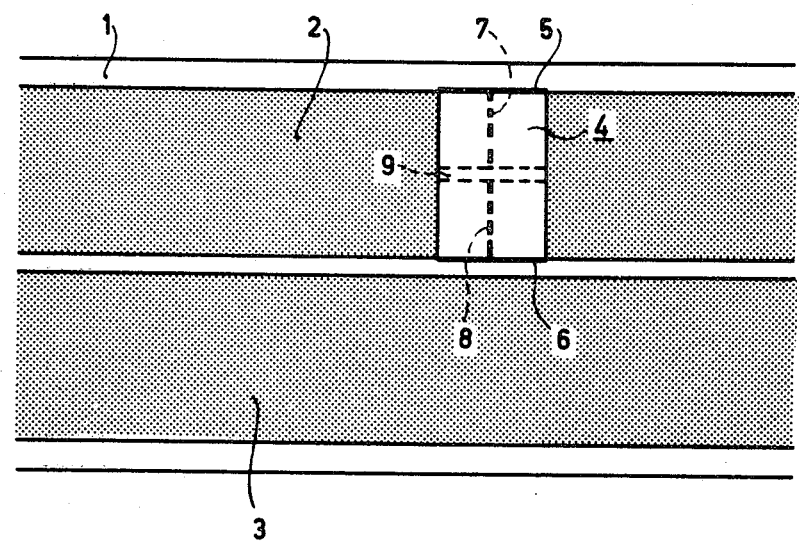

United States Patent [19]

De Niet et al.

[11] 4,317,144

[45] Feb. 23, 1982

[54] AZIMUTH CORRECTION OF HEAD GAPS

[75] Inventors: Edmond De Niet; Albert M. A. Rijckaert, both of Eindhoven, Netherlands

[73] Assignee: U.S. Philips Corporation, New York, N.Y.

[21] Appl. No.: 41,673

[22] Filed: May 23, 1979

[30] Foreign Application Priority Data

May 29, 1978 [NL] Netherlands .......................... 7805803

[51] Int. Cl.³ .............................................. G11B 5/43
[52] U.S. Cl. ........................................ 360/76; 360/109
[58] Field of Search ................. 360/76, 26, 27, 75, 360/109

[56] References Cited

U.S. PATENT DOCUMENTS

| | | | |
|---|---|---|---|
| 2,751,439 | 6/1956 | Burton | 360/76 |
| 2,938,962 | 5/1960 | Konins et al. | 360/76 |
| 3,414,816 | 12/1968 | Tobey et al. | 360/76 |
| 3,900,888 | 8/1975 | Uchikoshi et al. | 360/76 |
| 4,062,047 | 12/1977 | Scull | 360/26 |
| 4,074,328 | 2/1978 | Harwick | 360/76 |
| 4,101,937 | 7/1978 | Jenkins | 360/76 |

FOREIGN PATENT DOCUMENTS 488086 10/1975 U.S.S.R. ................................ 360/76

*Primary Examiner*—Alfred H. Eddleman
*Attorney, Agent, or Firm*—Robert S. Smith

[57] ABSTRACT

A method of and a device for automatically compensating the error in the angular position of a reproducing head, the upper half and the lower half of a track being scanned simultaneously, while the time difference between the zero passages of the signals is determined and a signal for the compensation of the angular error is derived therefrom.

17 Claims, 7 Drawing Figures

AZIMUTH CORRECTION OF HEAD GAPS

The invention relates to a method of adjusting and maintaining the correct angular position of a gap of a reproducing head relative to a signal on a magnetic record carrier, the phase difference between two scanned signals of identical appearance being measured and a control signal being derived therefrom for correcting the angular position of said gap.

Such a method is known from U.S. Pat. No. 2,751,439, in which a multiple reproducing head simultaneously scans a plurality of associated parallel tracks, of which the outer tracks contain identical signals. After amplification the output signals of those parts of the multiple magnetic head which scan the outer tracks are each supplied to an input of a phase comparator, whose output signal, which is a measure of the phase difference between said output signals of the magnetic head, is applied to a device which corrects the error in the angular position of the reproducing head. The object of this is to correct time errors in the video information which is recorded in associated parallel tracks, which errors are caused by an incorrect angular position of the gap.

However, an incorrect position of the gap also leads to a deterioration in the reproduction of high frequencies. As an example, an angular deviation of only few minutes of a reproducing head for an audio signal may give rise to a deterioration of the high frequency reproduction by a few kHz. Accordingly, it is evident that it is desirable that the correct position of the gap be maintained.

However, the known method requires at least one additional track to enable the head to be adjusted correctly, which reduces the total amount of information which can be recorded. Moreover, it is possible that in the case of multi-track recording and reproducing equipment all the tracks have not been recorded on the same apparatus, so that the correct position varies from track to track and thus cannot simultaneously be obtained for all tracks.

The object of the invention is to provide a simple and effective method which enables a correction of the position of the head gap for each track, without the need for additional tracks.

In accordance with the characteristic feature of the invention the scanned signals are obtained by separately scanning the upper half and the lower half of an information track to be reproduced at the same time.

Determining the phase difference between the two scanned signals may then give rise to problems because of the irregularity of said signals. In accordance with a further variant of the method these problems are avoided by measuring the time difference between every two associated zero passages of the signals scanned.

In accordance with a further variant of the inventive method the signals scanned are each passed through a low-pass filter whose cut-off frequency is lower than half the frequency corresponding to a signal whose period is equal to the maximum distance between two associated zero passages.

Thus, it is unambiguously defined which zero passages of the signals scanned are associated with each other, because it is desirable for this that the minimum distance between two zero passages of the same signal is at least twice as large as the maximum distance between two associated zero passages of both signals. The minimum distance between zero passages of the same signal is determined by the cut-off frequency of the filter.

In accordance with yet a further variant of the inventive method the signals scanned are each passed through band-pass filters whose bandwidth is preferably equal to two octaves and whose upper cut-off frequency is lower than half the frequency which corresponds to a signal whose period is equal to the maximum distance between two associated zero passages and which preferably extends from approximately 2 to approximately 8 kHz for audio applications.

Thus, it is achieved that the rate of control does not become too low, while the harmonics of the cut-off low frequencies remain available for control purposes.

If the signals thus filtered were applied directly to a phase comparator, the zero passages of the noise might be used for controlling in the absence of a signal or in the case of small signals, but these zero passages are not situated exactly the same because the two noise signals are not correlated.

In order to exclude this possibility, in accordance with a further embodiment of the invention, the signals scanned are each applied, after being filtered, to a time window circuit via a first pulse shaper and to a second pulse shaper via a threshold circuit having a threshold which is equal to or higher than the noise voltage of the signal, after which it is ascertained whether the leading edge of this pulse falls within the time window and, if this is the case, a pulse which is generated at the end of the time window is transferred by a gate circuit, the sum of the durations of the time window and the generated pulse being selected to be equal for both signals scanned, after which the generated pulses from both channels are each applied to an input of a phase detector, which measures the phase difference between the trailing edges of the generated pulses.

In accordance with yet another variant of the inventive method for stereo signals, the signals for each signal are applied to a logic circuit via an associated separate control device, which logic circuit combines the control signals at the outputs of the phase detectors.

A device for carrying out the invention is equipped with reproducing heads whose outputs lead to the inputs of a phase detector for measuring the phase difference between the two signals of identical appearance scanned by the reproducing heads. The output of the detector is connected to a control device to which an electromechanical transducer is connected. The transducer is adapted to adjust the angular position of the reproducing head and is characterized in that the reproducing head associated with each track comprises two identical parts for simultaneously scanning the upper half and the lower half of an information track to be reproduced.

In a further embodiment of the device in accordance with the invention each part of the reproducing head is connected to a low-pass filter, whose cut-off frequency is lower than half the frequency which corresponds to a signal whose wavelength is equal to the maximum distance between two corresponding points of the gaps of the two parts of the reproducing head measured in the direction of movement of the record carrier.

Thus, it is unambiguously defined which zero passages of the signals scanned are associated with each other.

In a further embodiment of the device in accordance with the invention each part of the reproducing head is connected to a band-pass filter, whose bandwidth is preferably equal to two octaves and whose upper cut-off frequency is lower than half the frequency which corresponds to a signal whose wavelength is equal to the maximum distance between two corresponding points of the gaps of the two parts of the reproducing head, measured in the direction of movement of the record carrier and which extends from approximately 2 to approximately 8 kHz for audio applications.

Thus, it is achieved that the rate of control does not become too low, whilst the harmonics of the low frequencies remain available for control purposes.

In yet another embodiment of the device in accordance with the invention each part of the reproducing head is connected, via its associated filter, both to a time window circuit via a first pulse shaper and to a second pulse shaper via a threshold circuit having a threshold which is equal to or higher than the noise voltage of the signal, the output of said second pulse shaper leading to a first input of a first AND-gate of which a second input is connected to the output of the time window circuit, which output also leads to the input of a delay line, whose output is connected both to a first input of a second AND-circuit and to the reset input of a switching device whose set input is connected to the output of the first AND-circuit, the output of the switching device being connected to the second input of the second AND-circuit whose output leads to an input of the phase detector, while the sum of the duration of the time window of the time-window circuit and the delay time of the delay line is substantially the same for both channels.

In a further embodiment of the device in accordance with the invention the associated time window circuits and delay lines each comprise one and the same delay element which is controlled by a common h.f. clock generator.

This enables the differences between the sums of the duration of the time window of the time window circuit and the delay time of the delay line for both channels to be made arbitrarily small by selection of the frequency of the h.f. clock generator, because the maximum error is equal to the duration of one full pulse spacing of the clock pulses.

In a further embodiment of the device in accordance with the invention the phase detector comprises two logic circuits each having two inputs, whose output is set on the trailing edge of a signal on the first input if the other input is at a first logic level and is reset or kept reset if the other input is at a second logic level, the first input of the first logic circuit being connected to the second input of the second logic circuit and the first input of the second logic circuit to the second input of the first logic circuit.

This ensures that a signal appears on the output of the phase detector only if a signal from both track halves appears on the two outputs simultaneously, the width of these output pulses being proportional to the time shift between the zero passages of the signals from the two track halves being a measure of the error in the angular position of the reproducing head.

In yet another embodiment of a device in accordance with the invention there is provided a separate control device for each stereo track, the outputs of the two phase detectors of said control devices being combined via a logic circuit.

This ensures that in the case of unequal angular errors of the two gaps of the heads associated with the stereo tracks adjustment is possible to the average angular error and/or in the absence of a signal in one of the two tracks control is possible in response to the available signal.

Figure 2:
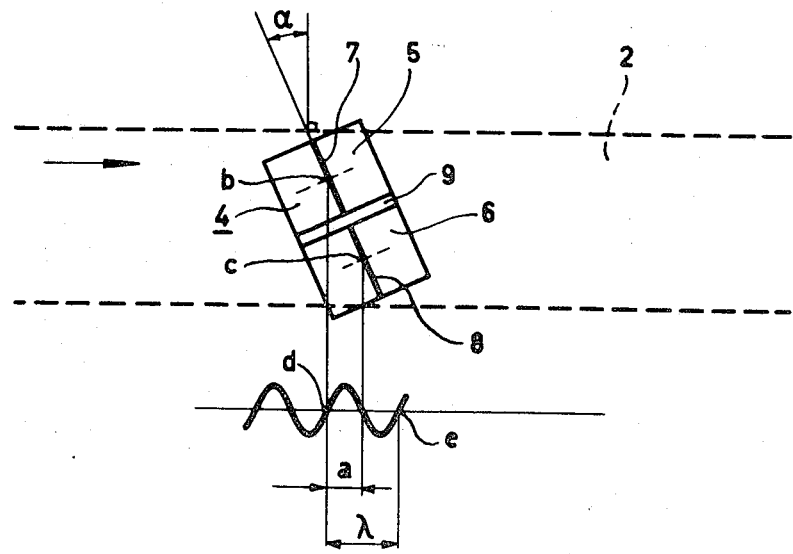
Figure 3:
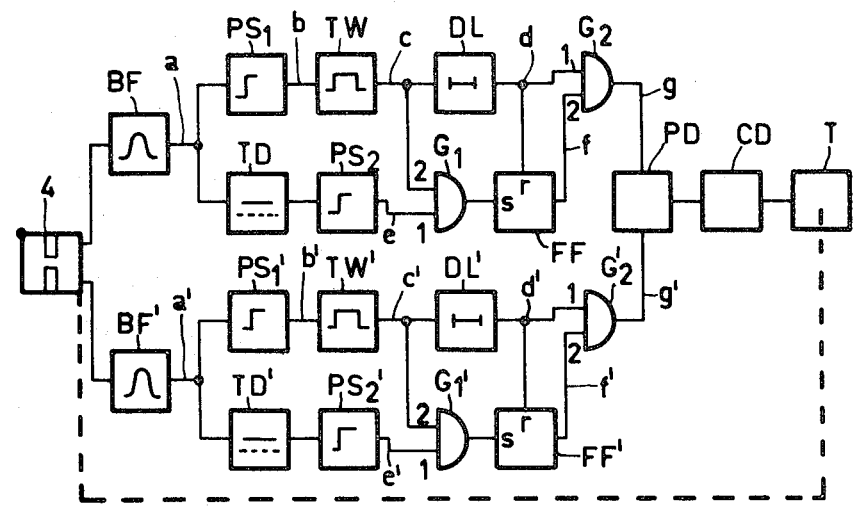
Figure 4:
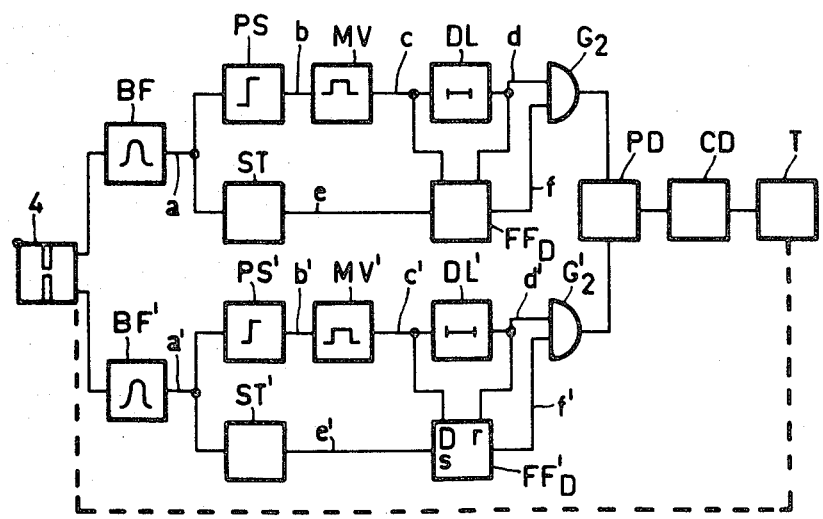
Figure 5:
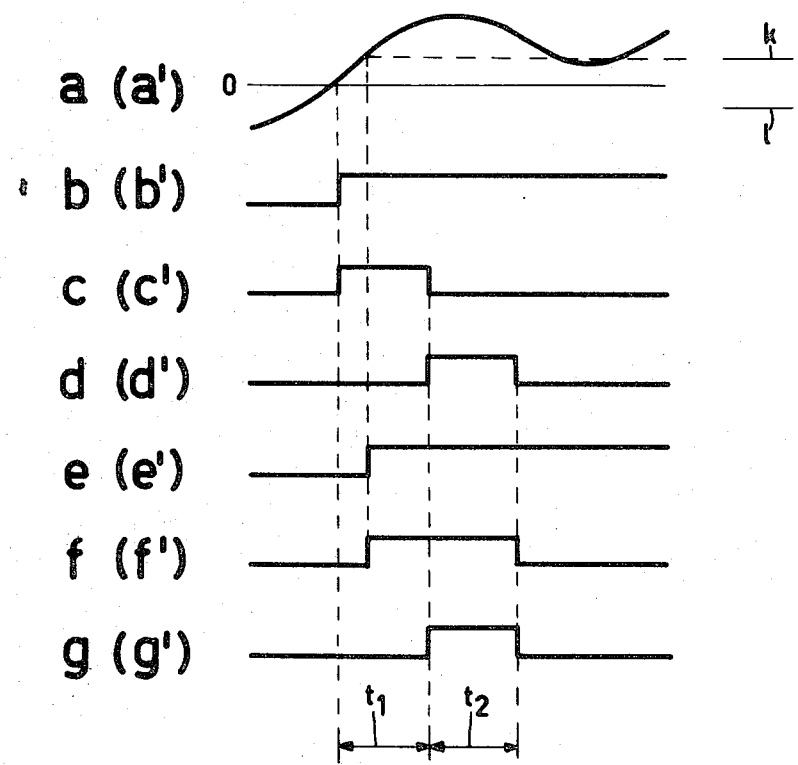
Figure 6:
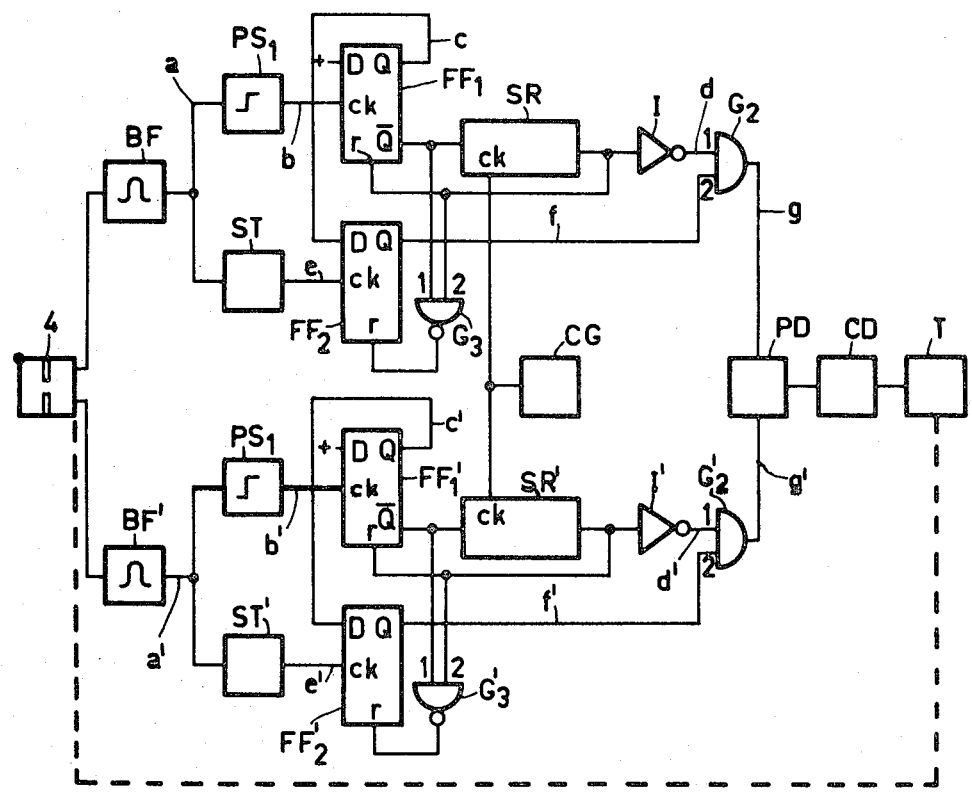
Figure 7:
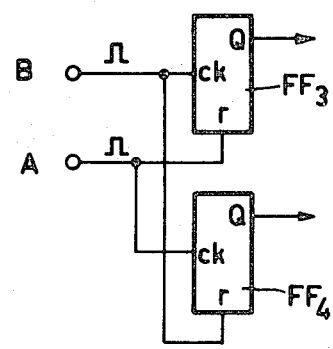

The invention will now be explained in more detail by way of example by means of descriptions of the Figures, of which FIG. 1 represents the head and tape configuration, FIG. 2 represents the relationship between the upper cut-off frequency of the filter and the angular error of the head, FIG. 3 is an example of a circuit for measuring the zero passages, FIG. 4 is another example of such a circuit, FIG. 5 shows the truth table associated with FIG. 3, 4 and 6, FIG. 6 shows an example with a shift register as delay element, and FIG. 7 shows an example of a phase detector.

FIG. 1 shows a record carrier 1 which in the present instance has two tracks 2 and 3 in which a signal has been recorded. These tracks are scanned by a reproducing head 4 consisting of two parts 5 and 6, which parts are each provided with a reproducing gap 7 and 8 respectively, which have small intermediate spacing 9 and which are disposed in line with each other. Obviously, the two parts can be mounted so as to adjoin each other directly without intermediate spacing 9. It is alternatively possible to employ different types of reproducing heads, such as for example a magneto-resistive head. Each part comprises a magnetic circuit provided with a winding, gap 7 scanning the upper half of track 2 and gap 8 the lower half.

FIG. 2 shows the reproducing head 4 of FIG. 1 in a position which corresponds to the maximum deviation $\alpha$ from the correct angular position. Half the wavelength $\lambda$ of a recorded signal, which is used for controlling the angular position, should be greater than the distance a between two corresponding points b and c the gaps 7 and 8 of the two parts 5 and 6 of the reproducing head 4, because otherwise the system can no longer compare the instant at which the zero passage e has arrived in b with the instant at which this zero passage has arrived in c, instead of the instant at which this zero passage e has arrived in c being compared with the instant at which the zero passage d has arrived in b.

In FIG. 3 the signal is applied to a band-pass filter BF and BF' respectively, whose bandwidth is preferably equal to two octaves and whose upper cut-off frequency is lower than half the frequency which corresponds to a signal whose wavelength is equal to the maximum distance a in FIG. 2 between two corresponding points b and c of the gaps 7 and 8 of the two parts 5 and 6 respectively of the reproducing head 4 measured in the direction of movement of the record carrier 1, which frequency band in the present example extends from 2 to 8 kHz. This band-pass filter BF and BF' is connected both to a time window circuit TW and TW' respectively via a first pulse shaper $PS_1$ and $PS_1'$ respectively and to a second pulse shaper $PS_2$ and $PS_2'$ respectively via a threshold circuit TD and TD' respectively which has a threshold which is equal to or higher than the maximum noise voltage, the output of said second pulse shaper leading to a first input of a first AND-circuit $G_1$ and $G_1'$ respectively, of which a second input 2 is connected to the output of the time window circuit TW and TW' respectively, which output also leads to the input of a delay line DL and DL' respectively, whose output is connected both to a first input 1 of a second AND-circuit $G_2$ and $G_2'$ respectively and to the reset input r of a switching device FF and FF' respectively, whose set input s is connected to the output of the first AND-circuit $G_1$ and $G_1'$ respectively, the output of the switching device FF or FF' being respectively connected to the second input 2 of the second AND-circuit $G_2$ and $G_2'$, whose output leads to an input of the phase detector PD. The output of the phase detector PD is connected to a control device CD to which an electromechanical transducer T is connected which can adjust the angular position of the reproducing head 4. Such an electromechanical transducer is known per se from U.S. Pat. No. 2,751,239.

For reproducing purposes the output signals of the two head sections are added, so that a reproducing signal with the normal signal-to-noise ratio is recovered.

A preferred construction for a reproducing head is described in the simultaneously filed U.S. patent application Ser. No. 41,674, now abandoned and refiled as Ser. No. 251,675, Apr. 6, 1981.

This circuit operates as follows: the signal which is taken from the reproducing head 4 is filtered by the respective band-pass filter BF or BF' and then for example has the appearance as shown under a in the truth table of FIG. 5. The pulse shaper $PS_1$ or $PS_1'$ respectively converts this signal into a pulse whose leading edge coincides with the zero passage of the signal a in FIG. 5. This pulse designated b in FIG. 5 is applied to the respective time window circuit TW or TW', in which a pulse designated c in FIG. 5, is formed having a specific duration $t_1$. This pulse opens the first AND-circuit $G_1$ or $G_1'$ for signals on its first input 1.

The signal from the band-pass filter BF or BF' is also applied to a threshold circuit TD or TD' respectively having a threshold, designated k and l in FIG. 5, which is equal to or higher than the noise voltage of the signal, whose outut signal is transferred to the second pulse shaper $PS_2$ and $PS_2'$ respectively. The leading edge of this signal always appears later than the leading edge of the signal on the output of the band-pass filter BF or BF' respectively and in the second pulse shaper $PS_2$ or $PS_2'$ it is converted into the pulse designated e in FIG. 5. This pulse is transferred by the opened first AND-circuit $G_1$ and $G_1'$ respectively to the set input s of the switching device FF or FF', which switching device consequently produces the signal designated f in FIG. 5 on its output and thus opens the second AND-circuit $G_2$ or $G_2'$ for a signal on its first input 1. The trailing edge of the pulse c appearing on the output of the time window circuit TW or TW' is transferred to its output as a positive level by the delay line DL or DL' respectively, which level after a delay time $t_2$ returns to zero, so that the pulse d of FIG. 5 appears on the outputs of the delay line DL or DL'. This pulse is transferred by the opened second AND-circuit $G_2$ or $G_2'$ and applied to the input of the phase detector PD. The trailing edge of the pulse d is also applied to the reset input r of the switching device FF or FF' and resets said switching device, so that the second AND-circuit $G_2$ and $G_2'$ respectively is closed again. As the sums of the durations of the time window $t_1$ or $t_1'$ of the time window circuit TW or TW' respectively and the delay time $t_2$ or $t_2'$ of the delay lines DL or DL' respectively are selected to be equal, the trailing edges of the pulses g on the output of the second AND-circuit $G_2$ or $G_2'$ determine the time difference between the two associated zero passages of the scanned signals, i.e. of the signals corresponding to the gaps 5 and 6 respectively. In the phase detector PD this time difference is converted into a signal whose amplitude or pulse width, depending on the type of phase detector, is proportional to the time difference. This signal is applied to the control device CD, which in its turn controls an electromechanical transducer T which connected to the reproducing head 4 in such a way that it is capable of adjusting its angular position and corrects the position depending on the signal applied to it. Preferably, a device in accordance with U.S. patent application Ser. No. 041,021 is used for the control device CD.

The said pulse shapers $PS_1$ or $PS_1'$ and $PS_2$ or $PS_2'$ respectively can be realized in various manners. For example an amplifier stage may be used having a very high gain, followed by a limiting circuit which limits the amplitude to a specific value.

For the threshold circuit it is for example possible to employ a so-called "Schmitt"-trigger ST or ST' whose trigger level has a value which is equal to the desired threshold voltage, the threshold device TD or TD' and the second pulse shaper $PS_2$ or $PS_2'$ respectively thus being combined. The first AND-circuit $G_1$ or $G_1'$ may also be combined with the switching device FF or FF' respectively to a D-flipflop whose D-input constitutes the second input 2 of the first AND-circuit $G_1$ or $G_1'$ and whose clock input serves as the first input of the first AND-circuit $G_1$ or $G_1'$. Another possibility is an amplifier with a high gain and built-in threshold, the output of the amplifier being at the one logic level if the signal from the filter BF or BF' is below the threshold value and at the other logic level if this signal exceeds the threshold value.

As time window TW or TW' a monostable multivibrator MV or MV' may be used, which may also be employed for the delay line DL or DL'. This possibility is shown in FIG. 4.

FIG. 6, for which the truth table of FIG. 5 is also valid, shows how the associated time window circuits TW and TW' and the delay lines DL and DL' respectively can be combined to a delay element for which in the present instance a shift register SR and SR' are used respectively, which shift register is controlled by common clock generators CG, which supplies pulses of a very high frequency, for example 1 MHz.

The filter BF or BF' is connected both to the set input ck of a bistable multivibrator $FF_1$ or $FF_1'$ respectively via the pulse shaper $PS_1$ and $PS_1'$ respectively, the $\overline{Q}$-outut of said bistable leading to the input of a shift register SR and SR' respectively, and to the first input 1 of a NAND-circuit $G_3$ and $G_3'$ respectively. The Q-output of the bistable multivibrator $FF_1$ or $FF_1'$ leads to the D input of a D-flip-flop $FF_2$ or $FF_2'$ respectively, which functions as switching device, whose clock input ck is connected to the output of a "Schmitt"-trigger ST and ST' respectively, which at the same time serves as threshold device and pulse shaper and which in its turn is connected to the band-pass filter BF and BF' respectively. The output of the respective shift register SR and SR' leads to the reset input r of the bistable multivibrator $FF_1$ or $FF_1'$ respectively, to the second input 2 of a NAND-circuit $G_3$ or $G_3'$ respectively and via an inverter I to the first input 1 of the second gate circuit $G_2$ or $G_2'$ respectively, whose second input 2 is connected to the Q-output of the D-flip-flop $FF_2$ or $FF_2'$ respectively. The leading edge of the input pulse a from the filter BF or BF' sets the bistable $FF_1$ or $FF_1'$ respectively via the pulse shaper $PS_1$ or $PS_1'$ respectively, so that its $\overline{Q}$ output becomes low and this low level is shifted through the shift register SR or SR' respectively at the frequency of the clock generator ck. At the same time the Q output of the bistable $FF_1$ or $FF_1'$ becomes high, so that the respective D-flipflop $FF_2$ or $FF_2'$ changes over upon arrival of a pulse from the "Schmitt"-trigger ST or ST' respectively, so that its Q-output and thus the second input 2 of the second AND-circuit $G_2$ or $G_2'$ respectively becomes high. When the low level arrives at the output of the shift register SR or SR' the reset input r of the bistable multivibrator $FF_1$ or $FF_1'$ respectively becomes low, so that its bistable multivibrator is reset and is kept reset until its $\overline{Q}$-output becomes high again and this high level is again shifted through the shift register SR or SR' respectively by the clock generator CG. When this high level arrives at the output of the shift register SR or SR' the second input 2 of the NAND-circuit $G_3$ or $G_3'$ respectively becomes high, its first input 1 already being high, because $\overline{Q}$ of the respective bistable FF or $FF_1'$ was high. As result of this a negative pulse appears on the output of the NAND-circuit $G_3$ or $G_3'$, which resets the D-flip-flop $FF_2$ or $FF_2'$ respectively, so that the second AND-circuit $G_2$ or $G_2'$ respectively is closed and the level on its output changes. As the output of the shift register SR or SR' has become high again, the reset input of the bistable $FF_1$ or $FF_1'$ respectively also becomes high and this bistable can be set again by a subsequent pulse. Since for this purpose both the falling and the rising edge of the signal on the input of the shift register SR or SR' is used in conjunction with the shifting of the signals through the shift register SR or SR' respectively, these devices together with the bistable $FF_1$ perform the function of the two monostable multivibrators of FIG. 4 and of the time window circuit in combination with the delay line of FIG. 3. It will be evident that instead of a shift register it is alternatively possible to employ a counter as delay element.

FIG. 7 shows how a phase detector can simply be realized by means of two logic circuits comprising bistable multivibrators, which circuits have two inputs which are set on the falling edge of a signal on the one input and are reset and/or maintained reset by a low level on the second input. The signal A from the upper half of the scanned track is applied to the reset input r of a bistable $FF_3$ and to the set input ck of a bistable $FF_4$. The signal B from the lower half of the scanned track is applied to the reset input r of the flip-flop $FF_4$ and to the set input ck of the flip-flop $FF_3$. If the zero passage of the signal from the upper half of the track appears first, the flip-flop $FF_4$ will be set and is subsequently reset by the signal from the lower half of the track whose zero passage appears later. As the flip-flop $FF_3$ is maintained reset no impulse can appear on its output, whereas a pulse can appear on the Q-output of the flip-flop $FF_4$. However, if the zero passage B of the signal from the lower half of the track arrives first, flip-flop $FF_3$ will be set and will be reset by the zero passage of the signal A from the upper half of the track, so that a pulse appears on its output. In this case no signal can appear on the Q-output of flip-flop $FF_4$.

The signal on the output of the flip-flop $FF_3$ is then for example used for rotating the head anti-clockwise and the signal on the output of the flip-flop $FF_4$ for rotating the reproducing head clockwise, in such a way that the error in the angular position of the head is corrected.

In the examples described it has been assumed that the positive-going zero passages of the signal are used for controlling, but it will be evident that it is alternatively possible to employ the negative-going zero passages for this purpose or even both types of zero passages, and in this last-mentioned case to process each type separately and to combine the output signals of the phase detectors and supply them to the control device.

In the case of stereo reproduction of two stereo tracks it may be desirable to control in response to the signals from both tracks, so that then a circuit in accordance with FIG. 3, 4 or 6 should be available for each track, the outputs of the two phase-detectors being combined via a logic circuit.

What is claimed is:

1. A method of adjusting and maintaining the correct angular position of a gap of a reproducing head relative to a signal on a magnetic record carrier which comprises: measuring the phase difference between two scanned signals of identical appearance and a control signal being derived therefrom for correcting the angular position of said gap, after obtaining the scanned signals by separately scanning the upper half and the lower half of axial portions of a single information track and measuring the time difference between every two associated zero passages of the scanned signals.

2. A method of adjusting and maintaining the correct angular position of a gap of a reproducing head relative to a signal on a magnetic record carrier which comprises: measuring the phase difference between two scanned signals of identical appearance and a control signal being derived therefrom for correcting the angular position of said gap, after obtaining the scanned signals by separately scanning the upper half and the lower half of axial portions of a single information track and passing the scanned signals through a low-pass filter whose cut-off frequencies is lower than half the frequency corresponding to a signal whose period is equal to the maximum distance between two associated zero passages of the scanned signals.

3. A method of adjusting and maintaining the correct angular position of a gap of a reproducing head relative to a signal on a magnetic record carrier which comprises: measuring the phase difference between two scanned signals of identical appearance being measured and a control signal being derived therefrom for correcting the angular position of said gap, after obtaining the scanned signals by separately scanning the upper half and the lower half of axial portions of a single information track and passing the scanned signals through a band-pass filter whose bandwidth is equal to two octaves and whose upper cut-off frequency is lower than half the frequency which corresponds to a signal whose period is equal to the maximum distance between two associated zero passages and which preferably extends from approximately 2 to approximately 8 kHz for audio applications.

4. A method as claimed in claims 1, 2 or 3, wherein after filtration the scanned signals are each applied to a time window circuit via a first pulse shaper and to a second pulse shaper via a threshold circuit having a threshold which is equal to or higher than the noise voltage of the signal, and then ascertaining whether the leading edge of this pulse falls within the time window and, if this is the case, transferring a pulse which is generated at the end of the time window by a gate circuit, the sum of the durations of the time window and the generated pulse being selected to be equal for both scanned signals, after which the generated pulses from both channels are each applied to an input of a phase detector, which measures the phase difference between the trailing edges of the two associated generated pulses.

5. A method as claimed in claims 1, 2 or 3, characterized in that for stereo signals each signal is applied to a logic circuit via an associated control device having a logic circuit which combines the control signals.

6. Apparatus including a reproducing head for adjusting and maintaining the correct angular position of a gap of a reproducing head relative to a signal on an associated magnetic record carrier which includes: at least two reproducing gaps and a phase detector connected to said two gaps for measuring the phase difference between the two output signals from said two gaps, said apparatus further including a control device having the output of said detector connected thereto and an electromechanical transducer connected to said control device, said transducer being adapted to adjust the angular position of the reproducing head, said two gaps being oriented for simultaneously scanning the upper half and the lower half of a single information track, said apparatus including two low-pass filters, each reproducing gap being connected to a low-pass filter whose cut-off frequency is lower than half the frequency which corresponds to a signal whose wavelength is equal to the maximum distance between two corresponding points of said gaps measured in the direction of movement of the associated record carrier.

7. A device as claimed in claim 6, characterized in that for stereo reproduction there is provided a separate control device for each stereo track, the outputs of the two phase detectors of said control devices being combined via a logic circuit.

8. Apparatus including a reproducing head for adjusting and maintaining the correct angular position of a gap of a reproducing head rather to a signal on an associated magnetic record carrier which includes: at least two reproducing gaps and a phase detector connected to said two gaps for measuring the phase difference between the two output signals scanned by said two gaps, said apparatus further including a control device having the output of said detector connected thereto and an electromechanical transducer connected to said control device, said transducer being adapted to adjust the angular position of the reproducing head, said two gaps being oriented for simultaneously scanning the upper half and the lower half of a single information track, said apparatus including two band-pass filters, each of said gaps being connected to one of said band-pass filters whose bandwidth is preferably equal to two octaves and whose upper cut-off frequency is lower than half the frequency which corresponds to a signal whose wavelength is equal to the maximum distance between two corresponding points of the gaps of the two parts of the reproducing gaps, measured in the direction of movement of the record carrier and which extends from approximately 2 to approximately 8 kHz for audio applications.

9. A device as claimed in claims 6 or 8, further including two associated filters, first and second pulse shapers, a threshold circuit, first and second AND-circuits, a switching device having a reset input and a set input and a delay circuit, one of said associated filters connecting each reproducing gap to said time window circuit via said first first pulse shaper and to said second pulse shaper via said threshold circuit, said threshold circuit having a threshold which is equal to or higher than the noise voltage of the signal, the output of said second pulse shaper leading to a first input of said first AND-circuit, a second input of said first AND-circuit being connected to the output of said time window circuit, the output of said time window circuit also leading to the input of said delay line, the output of said delay line being connected both to a first input of said second AND-circuit and to said reset input of said switching device whose set input is connected to the output of said first AND-circuit, the output of said switching device being connected to the second input of said second AND-circuit, said second AND-circuit having output leads connected to an input of said phase detector, the sum of the duration of the time window of the time window circuit and the delay time of the delay line being substantially the same for both channels.

10. A device as claimed in claim 9, characterized in that the associated time window circuits and delay lines each comprise one and the same delay element which further incudes and is controlled by a h.f. clock generator.

11. A device as claimed in claim 10, characterized in that said phase detector comprises two logic circuits each having two inputs, each of said logic circuits having an output which is set on the trailing edge of a signal on the first input if the other input is at a first logic level and is reset or maintained reset if the other input is at a second logic level, the first input of said first logic circuit being connected to the second input of said second logic circuit and the first input of said second logic circuit being connected to the second input of the first logic circuit.

12. A device as claimed in claim 11, characterized in that for stereo reproduction there is provided a separate control device for each stereo track, the outputs of the two phase detectors of said control devices being combined via a logic circuit.

13. A device as claimed in claim 10, characterized in that for stereo reproduction there is provided a separate control device for each stereo track, the outputs of the two phase detectors of said control devices being combined via a logic circuit.

14. A device as claimed in claim 9, characterized in that for stereo reproduction there is provided a separate control device for each stereo track, the outputs of the two phase detectors of said control devices being combined via a logic circuit.

15. A device as claimed in claim 8, characterized in that said phase detector comprises two logic circuits each having two inputs, each of said logic circuits having an output which is set on the trailing edge of a signal on the first input if the other input is at a first logic level and is reset or maintained reset if the other input is at a second logic level, the first input of said first logic circuit being connected to the second input of said second logic circuit and the first input of said second logic circuit being connected to the second input of the first logic circuit.

16. A device as claimed in claim 15, characterized in that for stereo reproduction there is provided a separate control device for each stereo track, the outputs of the two phase detectors of said control devices being combined via a logic circuit.

17. A device as claimed in claim 1, characterized in that for stereo reproduction there is provided a separate control device for each stereo track, the outputs of the two phase detectors of said control devices being combined via a logic circuit.

* * * * *